(12) United States Patent
Brock et al.

(10) Patent No.: US 12,314,045 B2
(45) Date of Patent: *May 27, 2025

(54) INDUSTRIAL CONTROL SYSTEM DATA TAP AND MODEL FOR MANAGING INDUSTRIAL CONTROL SYSTEM

(71) Applicant: Disney Enterprises, Inc., Burbank, CA (US)

(72) Inventors: Justin Brock, Clermont, FL (US); Brian Walters, Groveland, FL (US); Nicholas Stantzos, Winter Gardens, FL (US); Christopher Hofer, Ocoee, FL (US); Mario Scarabino, Kissimmee, FL (US); Michael Tschanz, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/979,364

(22) Filed: Nov. 2, 2022

(65) Prior Publication Data
US 2023/0051829 A1  Feb. 16, 2023

Related U.S. Application Data

(63) Continuation of application No. 16/696,543, filed on Nov. 26, 2019, now Pat. No. 11,550,310.

(51) Int. Cl.
*G05B 19/418* (2006.01)

(52) U.S. Cl.
CPC ..... *G05B 19/4188* (2013.01); *G05B 19/4183* (2013.01); *G05B 19/41875* (2013.01)

(58) Field of Classification Search
None
See application file for complete search history.

(56) References Cited

U.S. PATENT DOCUMENTS 8,374,725 B1    2/2013  Ols

OTHER PUBLICATIONS

Rosas, João Almeida das, et al. "Approach to adapt a legacy manufacturing system into the IoT paradigm." International Journal of Interactive Mobile Technologies (iJIM) 11.5 (2017). (Year: 2017).*

(Continued)

*Primary Examiner* — Carlos R Ortiz Rodriguez
(74) *Attorney, Agent, or Firm* — Sheppard Mullin Richter & Hampton LLP (57) ABSTRACT

Some implementations of the disclosure are directed to a method, comprising: receiving tapped data that was tapped from a controller of an industrial control system (ICS) while the controller executed first control code to control ICS devices of the ICS, the tapped data used during execution of the first control code, and the tapped data comprising input data obtained from one or more input components of the controller communicatively coupled to the ICS devices, or output data obtained from one or more output components of the controller communicatively coupled to the ICS devices; and after receiving the tapped data, executing, using at least the tapped data, second control code that provides an emulation of the controller, the emulation comprising running, using at least the tapped data, a process of the first control code at a faster rate than it is run by the controller executing the first control code.

20 Claims, 7 Drawing Sheets

(56) References Cited

OTHER PUBLICATIONS

Zipper et al., "Keeping the Digital Twin up-to-date—Process Monitoring to Identify Changes in Plant", 2018, IEEE, pp. 1592-1597.
Kadir et al., "Virtual Machine Tools and Virtual Machining—A Technological Review", Robotics and Computer-Integrated Manufacturing, 2011, vol. 27, pp. 494-508.

\* cited by examiner

INDUSTRIAL CONTROL SYSTEM DATA TAP AND MODEL FOR MANAGING INDUSTRIAL CONTROL SYSTEM

CROSS-REFERENCE TO RELATED APPLICATIONS

This application is a continuation of and claims priority to U.S. patent application Ser. No. 16/696,543, titled "INDUSTRIAL CONTROL SYSTEM DATA TAP AND MODEL FOR MANAGING INDUSTRIAL CONTROL SYSTEM" filed Nov. 26, 2019, which is incorporated herein by reference in its entirety.

BRIEF SUMMARY OF THE DISCLOSURE

Some implementations of the disclosure are directed to tapping input/output (I/O) data from an industrial control system (ICS) or applying the tapped I/O data to a learned model to perform predictive or prescriptive maintenance.

In one embodiment, a method comprises: tapping I/O data from a controller of an ICS while the controller executes first control code to control one or more ICS devices of the ICS; transmitting the tapped I/O data over a communications network to a second system; and executing, via the second system, second control code comprising an original or modified version of all or a subset of the first control code of the ICS, wherein the second control code executes in response to receiving the tapped I/O data. In some implementations, the controller is a programmable logic controller.

In some implementations, the second control code is configured to execute a process of the first control code at a faster rate than it is executed by the first control code, or the second control code is configured to execute a process that is not executed by the first control code. In particular implementations, execution of the first control code by the ICS generates a first human readable ICS text output providing an indication of a first parameter of the ICS, and wherein execution of the second control code generates the first human readable ICS text output and a second human readable ICS text output providing an indication of a second parameter of the ICS, wherein the second human readable ICS text output is not generated by execution of the first control code.

In some implementations, the second control code is executed using a virtual machine of the second system. The virtual machine may be configured to use the tapped I/O data to emulate a processing device of the controller, input components of the controller, and output components of the controller.

In some implementations, the method further comprises: providing an output of the execution of the second control code to a trained model to predict a future event involving the ICS or to prescribe maintenance of the ICS.

In some implementations, the method further comprises: running, via the second system, a digital twin that provides a virtual representation of a device, process, or system of the ICS, wherein the digital twin is run using the tapped I/O data. The digital twin may provide the virtual representation using one or more physics models representing the device, process, or system. In some implementations, the method further comprises: providing i) an output of the execution of the second control code and ii) an output of running the digital twin to a trained model to predict a future event involving the ICS or to prescribe maintenance of the ICS.

In some implementations, the method further comprises: extracting, via the second system, human readable text output from the tapped I/O data, wherein the human readable text output provides an indication of a parameter of the ICS. In some implementations, the method further comprises: providing i) an output of the execution of the second control code and ii) an output of running the digital twin; and iii) the extracted human readable text output to a trained model to predict a future event involving the ICS or to prescribe maintenance of the ICS.

In one embodiment, a non-transitory computer-readable medium has executable instructions stored thereon that, when executed by a processor, performs operations of: receiving at a second system, over a communications network, I/O data tapped from a controller of an ICS while the controller executes first control code to control one or more ICS devices of the ICS; and executing, via the second system, second control code comprising an original or modified version of all or a subset of the first control code of the ICS, wherein the second control code executes in response to receiving the tapped I/O data. The second control code may be configured to: execute a process of the first control code at a faster rate than it is executed by the first control code; or execute a process that is not executed by the first control code.

In one embodiment, a system comprises: an ICS, a network data tap and a second system. The ICS may comprise one or more ICS devices; and a controller configured to execute first control code to control the one or more ICS devices, wherein execution of the first control code causes the ICS to generate I/O data. The network data tap may be configured to tap the I/O data from the controller and transmit the tapped I/O data to the second system over a communications network. The second system may be configured to execute second control code comprising an original or modified version of all or a subset of the first control code, wherein the second control code executes in response to receiving the tapped I/O data.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As used herein to refer to ICS network systems, the term "computational twin" generally refers to a physical or virtual machine that executes an original or modified version of all or a subset of the control code of an ICS.

As used herein to refer to ICS network systems, the term "digital twin" generally refers to a dynamic, updated virtual representation of a physical, real-world process, device, or system of an ICS. A digital twin may include a virtual space that contains all of the information gathered from a real space, including control parameters, sensor data, and historical data for a particular device, process, or system of the ICS. For example, a digital twin may be used to provide a physics model representation of the operation of a motor of the ICS. In some implementations, a digital twin may provide a representation of the ICS as a whole. For example, a digital twin may represent an entire facility.

Distributed I/O systems in industrial control system (ICS) networks generally provide little data to end users. To obtain additional data, the underlying ICS software may need to be heavily modified. The limited computing resources of the ICS (e.g., processing resources, memory resources, etc.) may be unnecessarily wasted to provide the additional data to the end users. This may be a particular problem with legacy ICSs that cannot afford to waste computing resources. Another problem with many onsite ICSs is that adding more information or processing overhead in the system to provide feedback to the user may detrimentally affect the operation of the control system. A further problem with providing data from an ICS to an end user is that it may be difficult to access individual locations. Each remote I/O point may be spread across the system, making it difficult to access all of the I/O points of the ICS.

To address the aforementioned deficiencies of ICS networks, various implementations of the disclosure are directed to systems and methods for obtaining data from an ICS and applying the data to a learned model to perform predictive and prescriptive maintenance of the ICS. In accordance with implementations of the disclosure, a network tap may be provided to tap I/O data generated by the ICS from a controller of the ICS. The tapped ICS I/O data may be forwarded to a server or other processing device. By virtue of using this network tap, the ICS I/O data may be retrieved and recorded without creating additional overhead on the computing resources (e.g., processor) of the ICS.

In accordance with some implementations of the disclosure, the tapped I/O data may be processed using a computational twin that executes a copy of the ICS control code. The executed copy of the ICS control code may be the same as the original code or a modified variant of the original code. By virtue of using a computational twin to process the tapped I/O data, additional insights may be gained about the ICS without adding additional processing overhead to the ICS. For example, without being constrained to the original ICS's processor and memory, a computational twin equipped with the latest processing and memory components may compute additional information (e.g., by running the control code faster or by running a modified version of the original code that gathers additional information).

In accordance with some implementations of the disclosure, the tapped I/O data may be used to learn one or more models that use tapped I/O data to provide predictive or prescriptive maintenance notifications for the ICS. For example, given input I/O data tapped from an ICS, a learned model may output text that predicts future failures of the ICS, that predicts future maintenance events of the ICS, or that prescribes current maintenance step(s) for the ICS. The output text may be presented as an alert or notification that is delivered over a communication network to a device of an operator or manager of the ICS.

As further described below, a model may be learned using one or more of: i) the original, tapped I/O data, ii) the output of a computational twin that processes the tapped I/O data, iii) the output of a digital twin that applies the tapped I/O data to virtual model of a physical device, process, or system of the ICS, and iv) human readable control system text output extracted from the I/O data. By virtue of considering all of these sources of data, the model may be trained to automatically process and consider data that was not previously considered by the ICS due to the ICS's computational restraints or design restraints. The use of a learned model may efficiently and accurately identify potential failures or problems with the ICS that were not previously identifiable using the original ICS code or knowledge of human operators of the ICS. The use of a learned model may also reduce the frequency of false positives during maintenance of the ICS (e.g., identification of an issue with the ICS that is not actually present or identification of a wrong source of the issue). Moreover, by virtue of using a learned model that takes as an input the tapped I/O data, the model may be deployed on any authorized device or server, remote or local, opening the scope of parties or systems that assist with ICS maintenance.

These and other technical advantages that may be realized from implementing the systems and methods described may be further appreciated from the disclosure.

Figure 1:
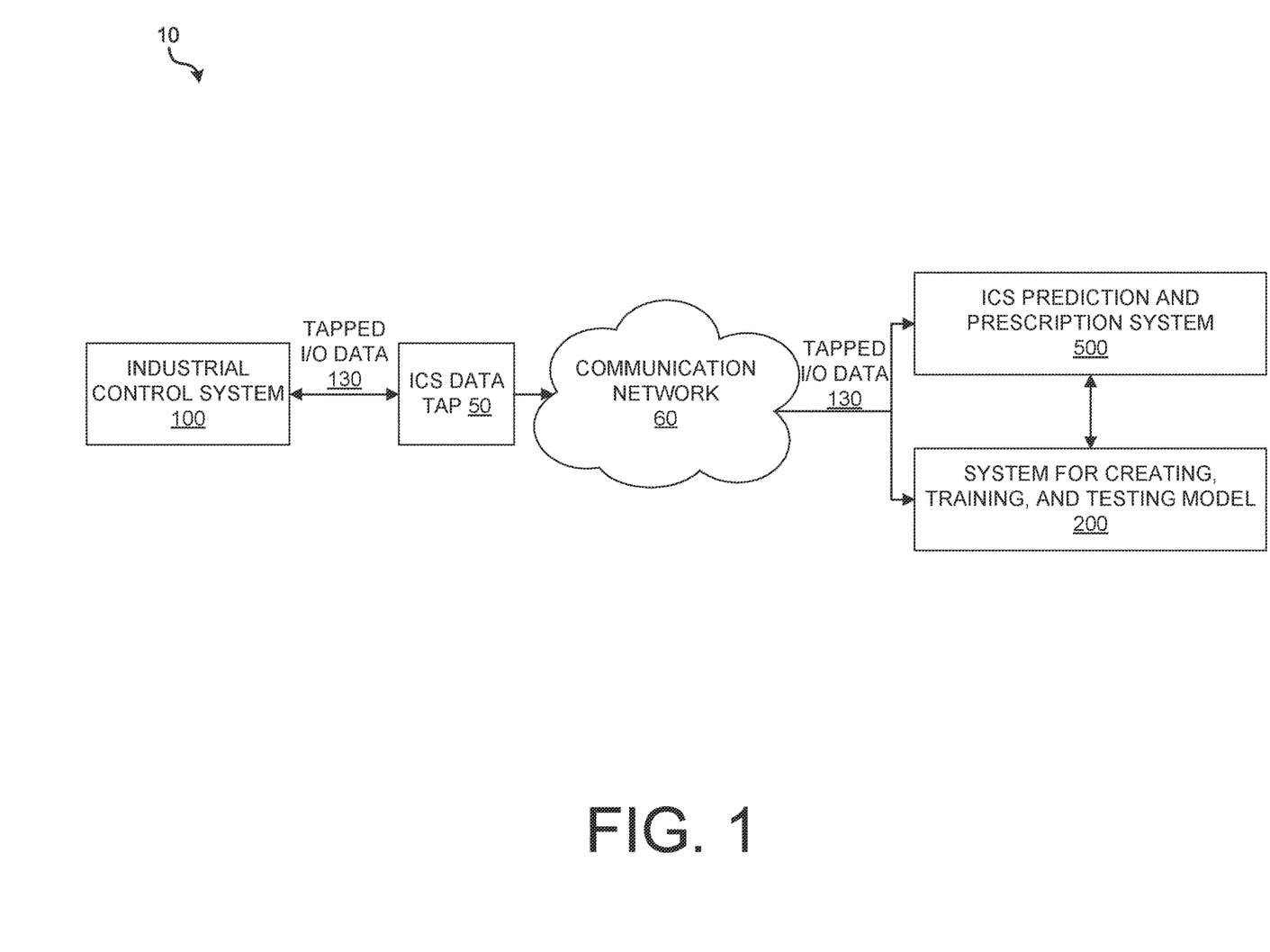
FIG. 1 illustrates an example industrial control system (ICS) network system in which one or more learned models may be used to perform predictive or prescriptive maintenance of an ICS, in accordance with implementations of the disclosure.

FIG. 1 depicts an example industrial control system (ICS) network system 10 in which one or more learned models may be used to perform predictive or prescriptive maintenance of an ICS 100, in accordance with implementations of the disclosure. During operation, an ICS 100 generates I/O data that is tapped by an ICS data tap 50. For example, the ICS data tap 50 may tap data from a programmable logic controller (PLC) or other controller of ICS system 100. The tapped I/O data 130 is transmitted over a communication network 60 from ICS data tap 50 to a system 200 for creating, training, and testing a model for predictive maintenance (e.g., to predict future problems) or prescriptive maintenance (to give guidance to correcting a problem) of ICS 100. The tapped I/O data 130 is also transmitted over communication network 60 to an ICS prediction and prescription system 500 that uses the model created, trained, and tested by system 200. In some implementations, the components of systems 200 and 500 may be integrated into a single system. For example, the same system may create, train, test, and use the model to provide predictive or prescriptive maintenance of ICS 100.

ICS 100 may be any ICS including a controller from which I/O data may be tapped. For example, ICS 100 may be an ICS for a theme park attraction (e.g., a simulation ride, a flat ride such as a carousel or twist, a gravity ride such as a roller coaster or water slide, a vertical ride such as a Ferris wheel, etc.), an ICS for an elevator system, an ICS for an air conditioning system, an ICS for a laundry system, etc.

ICS data tap 50 may be any device configured to tap digital I/O that is received or sent by a controller or some other component of ICS 100 during operation. ICS data tap 50 may be configured as a network forwarding device (e.g., a switch, a router, an access point, a gateway, etc.) that forwards tapped I/O data packets or frames to systems 200 and 500. For example, ICS data tap 50 may forward I/O packet information to a server or other processing device of systems 200 and 500 that may analyze and decode the packets. The forwarded packets may be encrypted by ICS data tap 50 for added security.

In some implementations, I/O data may be tapped from ICS 100 on its backplane (e.g., directly off the communication bus of the control system itself). Any suitable methods or systems may be used to acquire or otherwise tap I/O data from ICS 100. As such, to the extent the terms "tap," "tapped," or "tapping" are used to refer to I/O data of an ICS, it should be appreciated that this generally refers to any suitable method or system for acquiring I/O data from any component of ICS, control system or otherwise.

Communication network 60 may comprise any communication network suitable for transmitting tapped I/O data 130 from ICS data tap 50 to systems 200 and 500. It may include a combination of local area networks and a wide area network. Some non-limiting examples of mediums that may be used to communicate over network 60 include: wired communication mediums, such as cable, fiber-optic, or DSL; or wireless communication mediums such as WiFi, cellular communications, or satellite communications. In some implementations, systems 200 and 500 may be located on the same site as ICS 100. For example, if ICS 100 corresponds to a theme park attraction, systems 200 and 500 may be located in the same theme park. In other implementations, systems 200 and 500 may be remotely located from ICS 100. For example, systems 200 and 500 may be cloud-based systems that provide for remote or centralized management of ICS 100. In such instances, the tapped I/O data 130 may be transmitted to the cloud-based system (e.g., after encryption).

Figure 2:
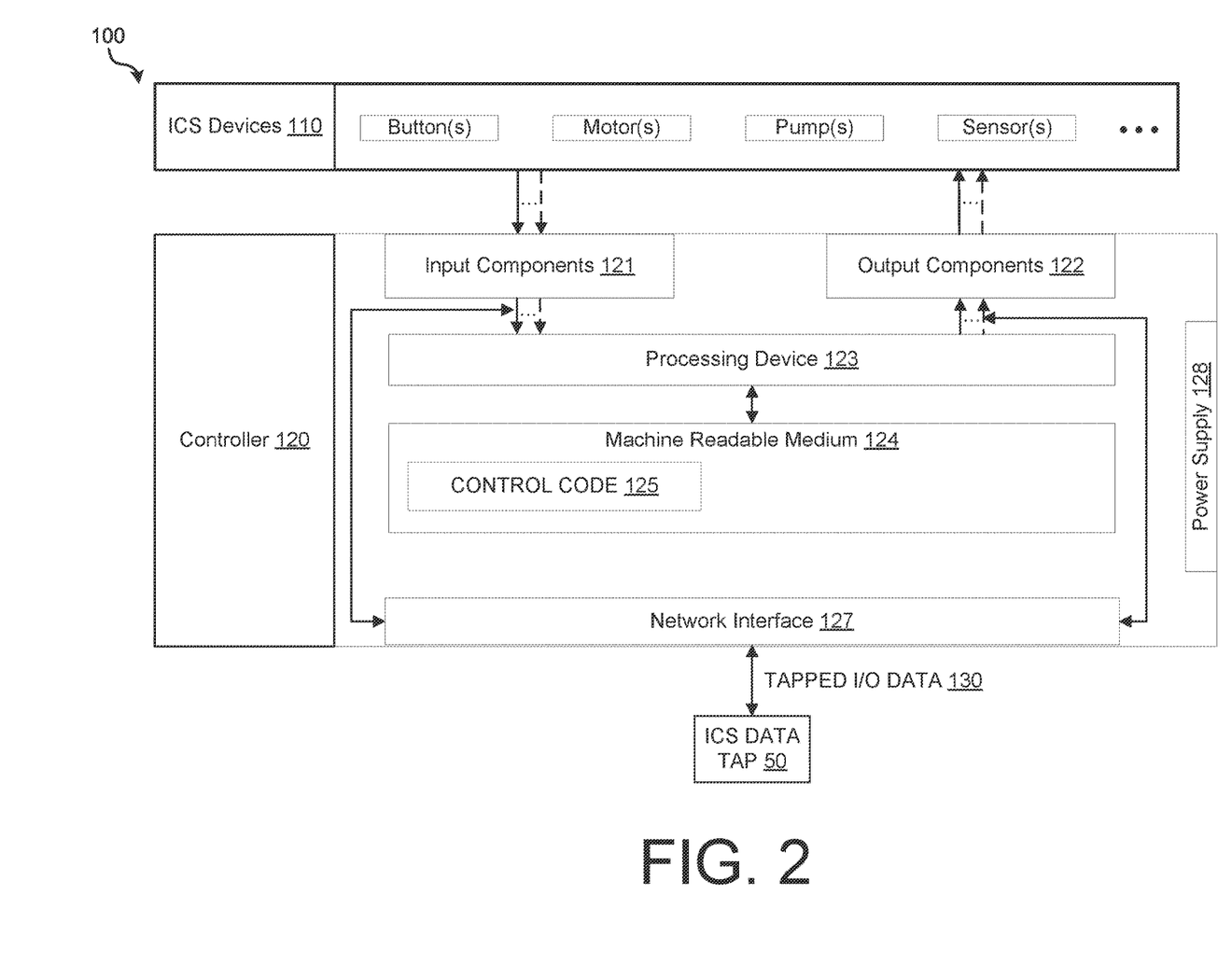
FIG. 2 is a block diagram illustrating an example architecture of the ICS of FIG. 1, in accordance with implementations of the disclosure.

FIG. 2 is a block diagram illustrating an example architecture of ICS 100, in accordance with implementations of the disclosure. ICS 100 includes a plurality of ICS devices 110 and a controller 120. The ICS devices 110 may include input hardware devices that provide data and control signals to controller 120 (e.g., switches and push buttons, sensing devices, limit switches, proximity sensors, photoelectronic sensors, temperature switches, level switches, pressure switches, etc.) and output hardware devices that communicate results of data processing carried by controller 120 (e.g., valves, motor starters, alarms, pumps, fans, control relays, etc.).

The ICS controller 120 includes input components 121, output components 122, a processing device 123, machine readable medium 124, network interface 127, and power supply 128 to supply power to the components of controller 120. Controller may be implemented as a PLC or other suitable ICS controller. The components of controller 120 may work together to bring data into the controller from output ICS devices 110, evaluate that data, and send data back out to input ICS devices 110.

Input components 121 may receive digital signal inputs or analog signal inputs from ICS devices 110. The analog signal inputs may represent process or machine conditions (e.g., as a voltage range) that are converted by circuitry of input components 121 into digital signal inputs that processing device 123 may use.

Processing device 123 may be configured to execute a control program or code 125 that is stored in machine readable medium 124. For example, processing device 123 and machine readable medium 124 may correspond to a central processing unit (CPU) and its associated memory. As it executes control code 125, processing device 123 may evaluate the status of inputs (e.g., inputs received via input components 121), outputs, and other variables.

The processing device 123 may generate and send control signals to control output ICS devices 110. The control signals may pass through output components 122 that convert them into a form that can be used to control various ICS devices 110. For example, output components 122 may convert the control signals from the processing device into digital or analog values that may be used to control various ICS devices 110. In some implementations, input components 121 and output components 122 may correspond to a plurality of I/O cards that provide a data interface between ICS devices 110 and processing device 123.

As depicted, ICS data tap 50 taps I/O data 130 via a network interface 127 of controller 120. The network interface 127 may communicatively couple to the communication links from input components 121 and processing device 123, and the communication links from processing device 123 to output components 122. The tapped I/O data 130 may include any digital data generated by input components 121 and any digital data generated by output components 122. More generally, any of the physical and digital information (translated or otherwise) transmitted by a component of ICS 100 (e.g., video processing information, velocity data, current data, voltage data, audio, accelerometer data, drive data, etc.) may be tapped from ICS 100. Data from components external to a control system of ICS 100 may be tapped. For example, consider a video display that is utilized in ICS 100. The video display may have its own network line that transmits data (e.g., about how video processing projector or other device is running). Data from this network line may be tapped as well.

Figure 3:
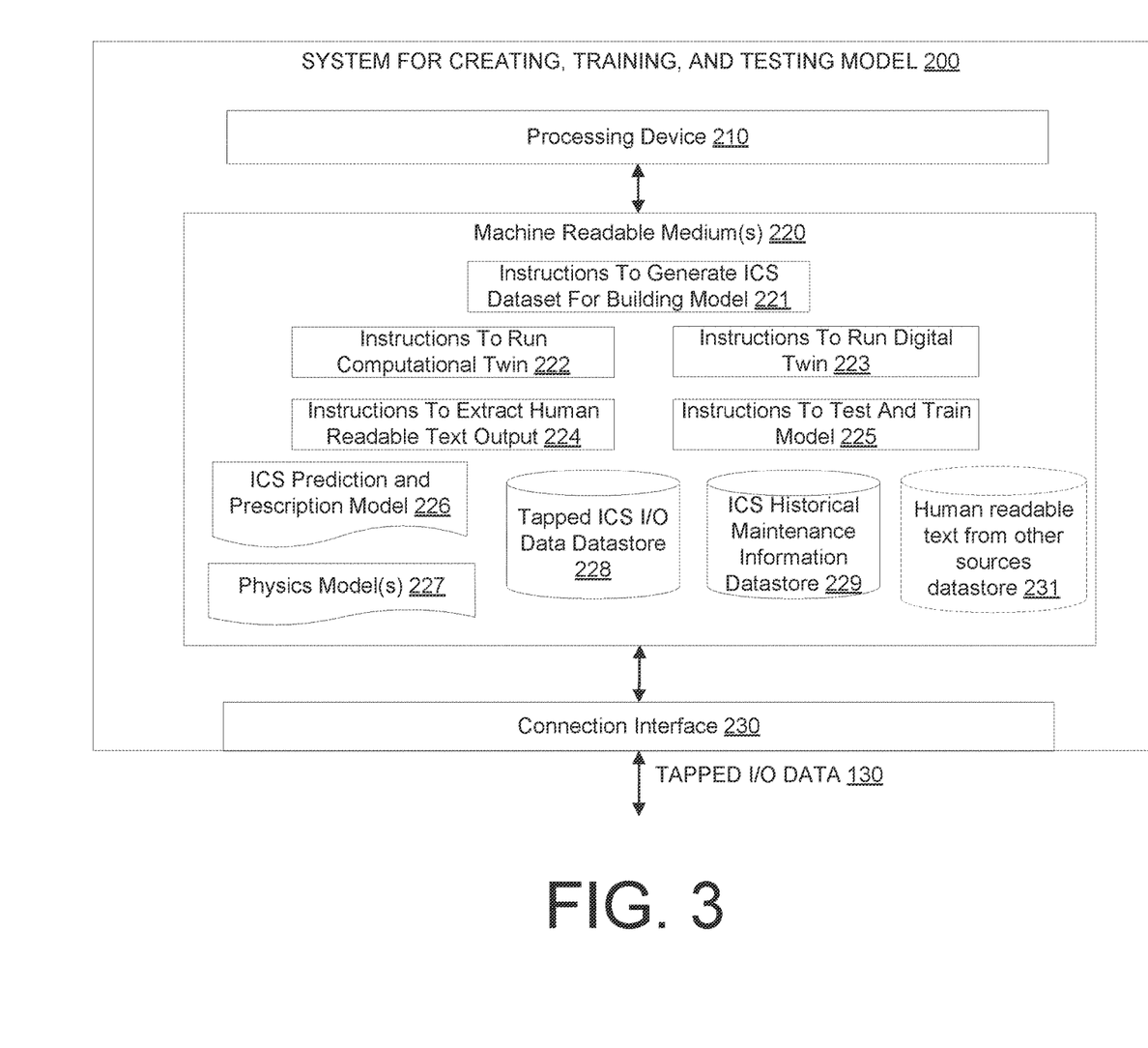
FIG. 3 is a block diagram illustrating an example architecture of a system for creating, training, and testing one or more learned models to perform predictive or prescriptive maintenance of the ICS of FIG. 1, in accordance with implementations of the disclosure.

FIG. 3 is a block diagram illustrating an example architecture of a system 200 for creating, training, and testing one or more learned models to perform predictive or prescriptive maintenance of ICS 100, in accordance with implementations of the disclosure. System 200 may include a processing device 210, one or more computer readable mediums 220, and a connection interface 230.

Connection interface 230 may be configured to receive tapped I/O data 130 from ICS data tap 50 over communication network 60. Additionally, connection interface 230 may be configured to communicatively couple system 200 to ICS prediction and prescription system 500. For example, connection interface 230 may be configured to transmit a file including trained model 226 to system 500. In some implementations, connection interface 230 may comprise a wired interface (e.g., an Ethernet interface, a USB interface such as a USB Type-C interface, a THUNDERBOLT interface, etc.). In some implementations, connection interface 230 may comprise a wireless interface (e.g., a WiFi communications interface, a cellular communications interface, a satellite communications interface, etc.). In some implementations, connection interface 230 may comprise a combination of both wired and wireless interfaces.

Computer readable medium(s) 220 may store a variety of different datasets or algorithms to perform various methods in accordance with the disclosure. For example, medium(s) 220 may store an ICS prediction and prescription model 226 generated in accordance with implementations of the disclosure. Medium(s) 220 may also store one or more physics model(s) 227 that provide virtual representations of one or more processes, devices, or systems of ICS 100. Medium(s) 220 may also store a tapped ICS I/O data datastore 228 (e.g., database) that stores tapped I/O data 130 received over communication network 60. In some implementations, the tapped I/O data 130 may include timestamps or other identifiers of a sequence of time when the data was generated. Medium(s) 220 may further store a datastore 229 including historical maintenance information of ICS 100. The datastore 229 may include text messages relayed to operations and maintenance of ICS 100 or workplace information provided as part of corrective action taken to solve or prevent a problem pertaining to ICS 100. In some implementations, medium(s) 200 may also store one or more additional datastores 231 of human readable text from other sources, such as datastores used to diagnose problems in the ICS hardware and/or software that are used by operators of the ICS to understand an appropriate response when addressing potential issues with the ICS. This additional contextual data, when considered by a model for performing prescriptive or predictive maintenance may help filter out responses such as false positives.

Computer readable medium(s) 220 may also store a variety of different instructions that are executable by processing device 210 to perform various methods in accordance with the disclosure. For example, medium(s) 220 may store instructions 221 that are executable by processing device 210 to generate an ICS dataset for building a model 226 using at least tapped I/O data 130. Medium(s) 220 may also store instructions 222 that are executable by processing device 210 to run a computational twin that executes an original or modified version of all or a subset of the control code 125 of ICS 100. Medium(s) 220 may also store instructions 223 that are executable by processing device 210 to run a digital twin that provides a virtual representation of a physical, real-world process, device, or system of ICS 100. For example, the digital twin may provide a physics model representation of the operation of a motor of ICS 100. Medium(s) 220 may also store instructions 224 that are executable by processing device 210 to extract human readable text output from tapped I/O data. Medium(s) 220 may further store instructions 225 that are executable by processing device 210 to test and train a model 226.

Figure 4:
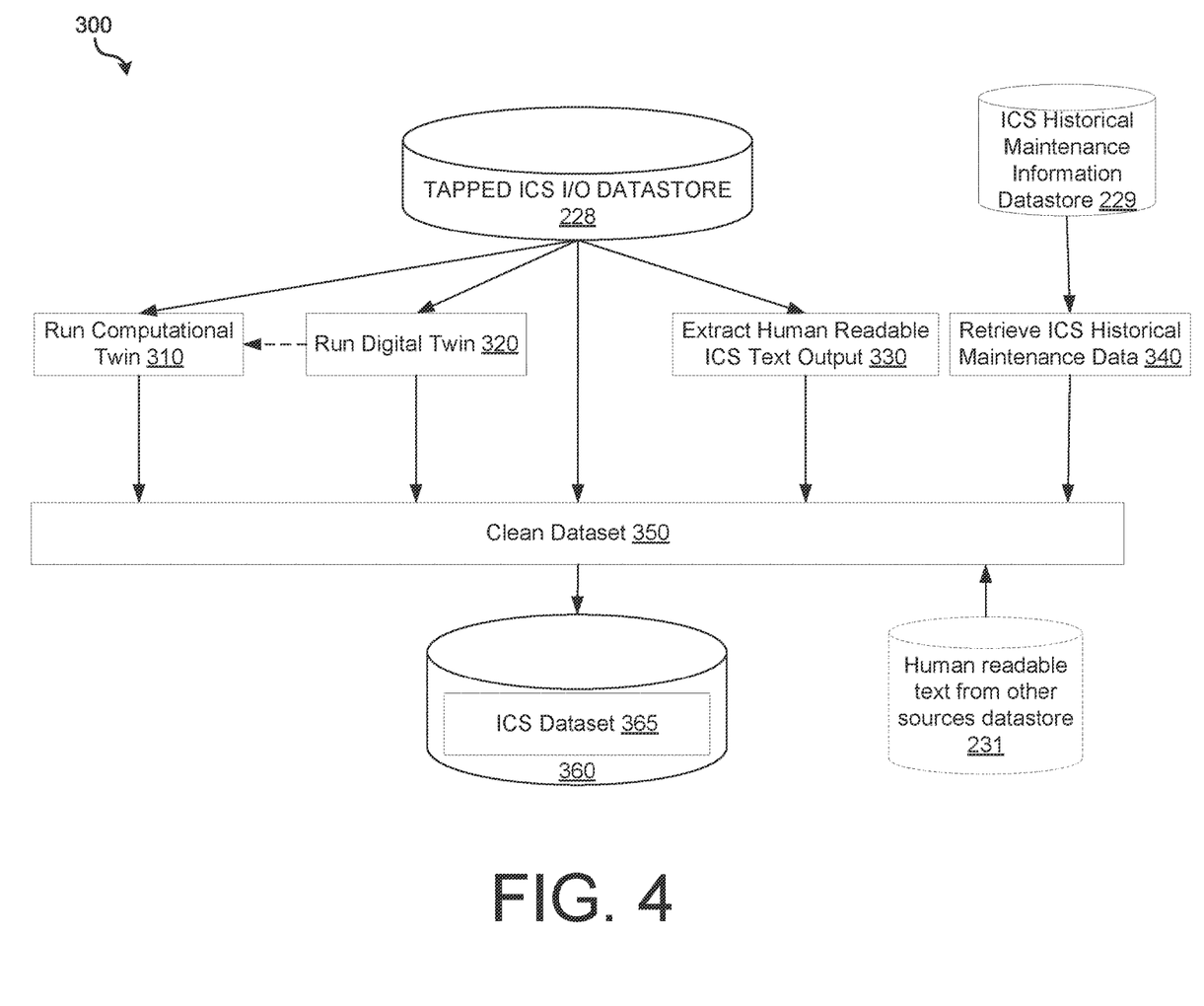
FIG. 4 is an operational flow diagram illustrating an example method for using tapped ICS I/O data to generate an ICS dataset for learning one or more models to perform predictive and prescriptive maintenance of the ICS of FIG. 1, in accordance with implementations of the disclosure.

FIG. 4 is an operational flow diagram illustrating an example method 300 for using tapped ICS I/O data to generate an ICS dataset 365 that may be used for learning one or more models (e.g., model 226) to perform prediction and prescriptive maintenance of ICS 100, in accordance with implementations of the disclosure. In some implementations method 300 may be implemented by a processing device 210 executing instructions 221 and one or more of instructions 222, 223, and 224.

At operation 310, a computational twin is run (e.g., by executing instructions 222) using the ICS I/O data of tapped ICS I/O datastore 228. The computational twin executes an original or modified version of all or a subset of the control code 125 of ICS 100. The computational twin may run using a virtual machine. For example, the computational twin may use tapped ICS I/O data to provide an emulation of controller 120, including input components 121, output components 122, and processing device 123. In some implementations, the computational twin may be run using hardware that emulates components of the control system of the ICS (e.g., commoditized hardware that is designed to emulate control systems). In some implementations, the computational twin may be run using a combination of virtualized and physical hardware.

The computational twin emulating the controller 120 may be configured to expand upon the human readable textual information output by ICS 100 by virtue of not being limited to the same bandwidth constraints of human operators reading the text. Additionally, by virtue of not having the same memory and bandwidth constraints of controller 120 (e.g., by leveraging modern hardware components that far exceed the processing capabilities of a legacy controller), far greater information may be processed and output by the computational engine of the computational twin.

In some implementations, certain routines or processes within the original control code 125 may be run at a greater speed or scan rate, allowing the generation of additional messages or other data. For example, while ICS controller 120 may run one or more processes at a rate on the scale of tens of milliseconds, the I/O data may be generated at a much finer rate (e.g., on the scale of milliseconds or less). By running the same process(es) on the computational twin at a much greater rate, the computational twin may detect a sampling discrepancy that was not detectable because of the sampling rate of the controller (e.g., the controller was sampling slower than it should have been, or the controller was not capable of sampling the data any faster). As such, by virtue of running the computational twin, the ICS may be less susceptible to changes in I/O data.

In some implementations, additional routines or processes may be added to the control code, or original routines or processes may be modified to provide additional information. This may permit the generation of additional messages that a control systems engineer would have preferred for ICS 100 but were not available due to hardware or software programming constraints of controller 120.

The computational twin may provide an improved mechanism of performing data analytics of ICS 100 that has not been previously performed. By emulating/duplicating and augmenting the operation of the control system, additional prescriptive or predictive actions may be devised for ICS 100. In some implementations, the output of the computational twin may be used for this purpose, regardless of whether or not it is used to build a model for prescriptive and predictive maintenance.

In some implementations, the computational twin may itself be configured to run some of its code based on one or more additional data streams (input and/or output) generated by one or more sensors external to ICS 100. For example, the one or more external sensors may be integrated into a hardware system including the computational twin. The one or more external hardware sensors may be configured to emulate the behavior of ICS devices 110. In some implementations, the operation of the external sensors may be virtualized.

At operation 320, a digital twin is run (e.g., by executing instructions 223) using the ICS I/O data of tapped ICS I/O datastore 228. The digital twin may be run using one or more physics models 227 that provide virtual representations of one or more processes, devices, or systems of ICS 100. For example, the digital twin may include a virtual space that contains all of the tapped I/O data for a particular device, process, or system of ICS 100 such as control parameters, sensor data, or historical data. The digital twin may also run one or more physical models that represent facility dynamics to verify operational efficiency and accuracy of the ICS 100 or its components.

In some implementations, the digital twin may itself be configured to run based on one or more additional data streams (input and/or output) generated by one or more sensors external to ICS 100.

In some implementations, depicted by FIG. 3, the computational twin may also run by using the output of the digital twin, or by running the digital twin itself. The computational twin may run the digital twin using a physics model 227 and data output from the ICS facilities. By way of example, consider an ICS facility at which a motor's rate is tracked by the control system. A model of the motor's encoder may be run, and its output may be fed to the computational twin.

At operation 330, human readable text output by ICS 100 is extracted from the ICS I/O data of tapped ICS I/O datastore 228. The human readable text may include any messages, showing the state of the ICS, that are designed to be presented to an operations or maintenance team during operation of ¬100. During typical operation of the control system, these messages may appear on a display. For example, in the context of a ride system, these messages may provide a readable textual indication to a human operator that gates opened (e.g., "gate 3 open"), that gates are engaged (e.g., "gate 2 engaged"), that a vehicle took a certain amount of time to travel between two points (e.g., "30 seconds"), or any other human readable information that provides an indication of what is occurring at a facility associated with the ride system.

At operation 340, historical maintenance data of ICS 100 is retrieved from ICS historical maintenance information datastore 229. The historical maintenance data may include text messages relayed to operations and maintenance of ICS 100 or workplace information provided as part of corrective action taken to solve or prevent a problem pertaining to ICS 100. In some implementations, the historical maintenance data of ICS 100 may provide a historical record that is used to verify the output accuracy of a model trained to perform predictive and prescriptive maintenance.

As also depicted by method 300, other I/O data may be directly extracted from I/O datastore 228.

At operation 350, the ICS dataset is cleaned or normalized. For example, in some implementations, categories of data may be merged into a single feature. As another example, categories of data that are less likely to be relevant to the maintenance of ICS 100 may be removed or weighed with less priority from the dataset to focus the subsequent machine learning process on training data including key features that are likely to be indicative of predictive or prescriptive maintenance of ICS 100. Categories of feature data that are more likely to be indicative of maintenance of the ICS 100 may be weighed with high priority. For example, the output of running the computational twin at operation 310 or ICS historical maintenance data retrieved at operation 340 may be emphasized over some other feature data. In some implementations, categories of feature data may be split into multiple features. It should be noted that cleaning operation 350 may be performed concurrently with operations 310-340 or after operations 310-340. It should also be noted that operations 310-340 may be performed in any order or concurrently.

Following extraction of feature data, it may be stored/cataloged in a database/library or other datastore 360 as an extracted ICS dataset 365 that may be used to train and test one or more machine learning models used to provide prescriptive or predictive maintenance of ICS 100 given tapped ICS I/O data. For example, as further discussed below, given tapped ICS I/O data that is used to run a computational twin 310, the model may predict future maintenance events of ICS 100. It should be noted that process 300 may be iterated over time to refine the dataset used to train and test the aforementioned machine learning models. For example, over time it may be discovered that certain categories of feature data (e.g., output of running computational twin) are more likely to be indicative of maintenance events. Further, as additional I/O data is tapped for ICS 100, ICS dataset 365 may be expanded. As such, it should be appreciated that the features, categorization, and size of the extracted ICS dataset 365 may change over time.

It should be appreciated that although method 300 is described in the context of building a dataset for model learning from five different inputs (i.e., output of each of operations 310-340 and datastore 228), fewer than five of these inputs (e.g., four, three, two, or one) or more than five of these inputs (e.g., input from additional datastore 231, described above) may be used to create the dataset. For example, ICS dataset 365 may be generated using only the output of running computational twin 310. It should also be appreciated that the types of data that may be extracted from ICS I/O datastore 228 are illustrative, and that other types of ICS I/O data may be extracted.

Figure 5:
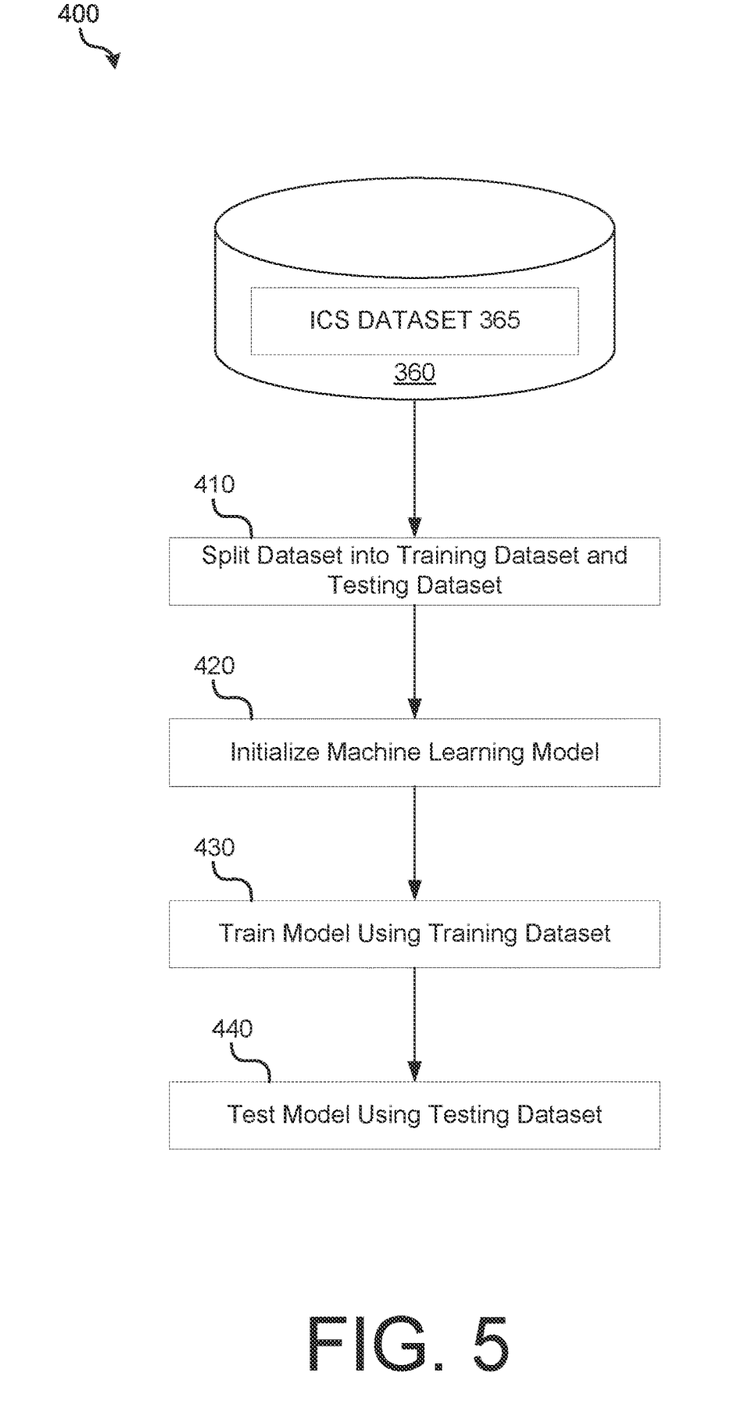
FIG. 5 is an operational flow diagram illustrating an example method for creating, training, and testing one or more models used to perform predictive and prescriptive maintenance of the ICS of FIG. 1, in accordance with implementations of the disclosure.

FIG. 5 is an operational flow diagram illustrating an example method 400 for creating, training, and testing one or more models that uses tapped I/O data to perform predictive and prescriptive maintenance of ICS 100, in accordance with implementations of the disclosure. In some implementations method 400 may be implemented by a processing device 210 executing instructions 225.

At operation 410, the extracted ICS dataset 365 stored in a datastore 360 may be split into a training dataset and testing dataset. In implementations, each of the training dataset and testing dataset may comprise a subset of the output of performing one or more of operations 310-330 on this tapped I/O data, and known predictive or prescriptive maintenance action(s) that was taken in the past at the time that the tapped I/O data was gathered (e.g., as determined from operation 340). In implementations, the training dataset may comprise a majority of the dataset (e.g., 60%, 70%, 80%, etc.). In implementations, the datasets may be randomized, prior to splitting, to ensure an equal distribution of patterns of data.

At operation 420, a machine learning model may be initialized to perform training using the training dataset. The model may be selected to find patterns/trends between the output of one or more of operations 310-330, and a maintenance event that was performed at ICS 100 at the same time (e.g. as determined by operation 340). The model may also be selected to find patterns/trends between the output of the raw I/O data and a maintenance event that was performed at ICS 100 at the same time.

In implementations, the model may be initialized by selecting one or more supervised learning algorithms that learn patterns using known inputs and known outputs. For example, in some implementations a known input may include an output of running a computational twin or digital twin on a set of tapped I/O data retrieved during a particular time period, and a known output may include a maintenance event that was detected or prescribed during the same time period.

Supervised learning algorithms such as linear regression, logistic regression, decision trees, k-nearest neighbors, neural networks, and/or support vector machines may be utilized. During initialization, hyperparameters of the algorithms may be set. In some implementations, an ensemble model that combines multiple statistical modeling techniques may be utilized. For example, bagging (averaging of multiple models), a bucket of models (using training data to create different models, and then picking the best one), boosting, stacking, or other ensemble model techniques may be utilized.

In some implementations, unsupervised learning algorithms may be utilized to initialize the model. For example, k-means clustering, principal and independent component analysis, association rules, or other suitable unsupervised learning algorithms may be used. In some implementations, semi-supervised learning algorithms or a combination of supervised and unsupervised learning algorithms may be used.

At operation 430, the model may be trained using the training dataset. For example, using one or more of the aforementioned supervised learning algorithms, a machine may analyze and determine relationships between the output of one or more of running the computational twin on the tapped I/O data, running the digital twin on the tapped I/O data, and the human readable ICS text extracted from the I/O data in the training data to develop a model that may predict maintenance event data given this input data.

At operation 440, the model developed during training may be tested using the testing dataset. For example, given the output of performing one or more of operations 310-330 on a particular set of tapped I/O data corresponding to a particular time period, that data may be provided to the trained model to predict data of a predictive or prescriptive maintenance event for ICS 100 for the same time period. The data of the predictive or prescriptive maintenance event that is calculated by the model may thereafter be compared with an actual, known maintenance event in the testing dataset from the same time period event (e.g., as determined from operation 340) to determine an accuracy of the model.

In implementations, the performance of the model may be calculated from testing as an average error score for all predictions. If the average error score is too high, additional iterations of method 400 (and optionally, method 300) may be performed. For example, hyperparameters of the algorithms used in the model may be adjusted, the algorithms of the model may be changed, and/or different features of data may be considered in the model. Alternatively, if the mean absolute error is satisfactory, the model (e.g., model 226) may be made available to system 500 to provide predictive and prescriptive maintenance of ICS 100.

In some implementations of method 400, different models may be trained, tested, and/or developed. For example, separate models may be created to predict or prescribe maintenance events based on the outputs of a computational twin and a digital twin. In some implementations of method 400, a cross validation process may be performed whereby training and testing data is split into various combinations and trained and tested in these various combinations. For example, an exhaustive cross validation or k-fold validation process may be performed.

Figure 6:
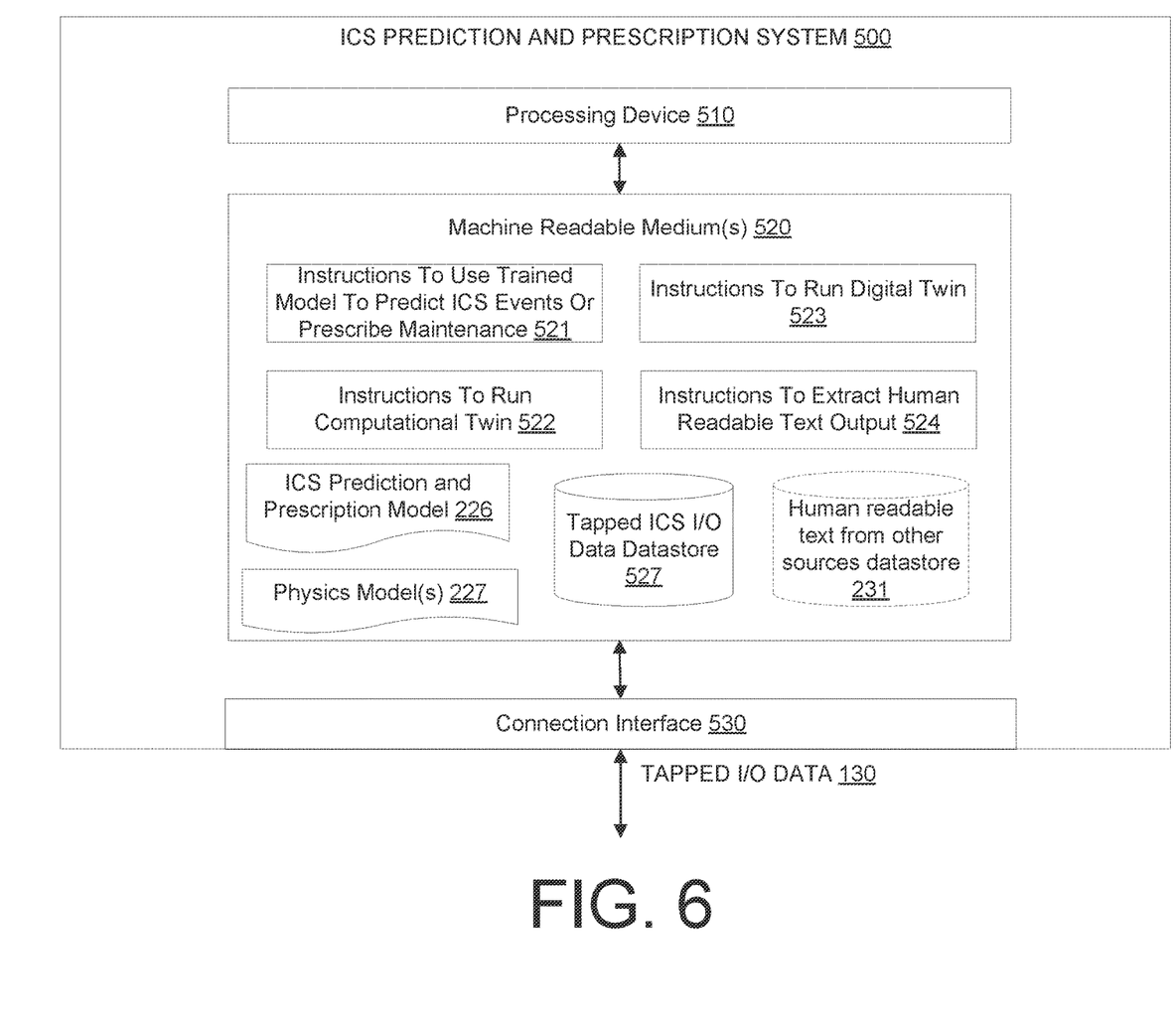
FIG. 6 is a block diagram illustrating an example architecture of the ICS prediction and prediction system of FIG. 1, in accordance with implementations of the disclosure.

FIG. 6 is a block diagram illustrating an example architecture of ICS prediction and prescription system 500, in accordance with implementations of the disclosure. System 500 may include a processing device 510, one or more computer readable mediums 520, and a connection interface 530.

Connection interface 530 may be configured to receive tapped I/O data 130 from ICS data tap 50 over communication network 60. Additionally, connection interface 530 may be configured to communicatively couple system 500 to system 200 for creating, training, and testing a model. For example, connection interface 530 may be configured to receive a file including trained model 226 from system 200. In some implementations, connection interface 530 may comprise a wired interface (e.g., an Ethernet interface, a USB interface such as a USB Type-C interface, a THUNDERBOLT interface, etc.). In some implementations, connection interface 530 may comprise a wireless interface (e.g., a WiFi communications interface, a cellular communications interface, a satellite communications interface, etc.). In some implementations, connection interface 530 may comprise a combination of both wired and wireless interfaces.

Computer readable medium(s) 520 may store a variety of different datasets or algorithms to perform various methods in accordance with the disclosure. For example, medium(s) 520 may store an ICS prediction and prescription model 226 generated in accordance with implementations of the disclosure. Medium(s) 520 may also store one or more physics model(s) 227 that provide virtual representations of one or more processes, devices, or systems of ICS 100. Medium(s) 520 may also store a tapped ICS I/O data datastore 527 (e.g., database) that stores tapped I/O data 130 received over communication network 60. In some implementations, the tapped I/O data 130 may include timestamps or other identifiers of a sequence of time when the data was generated. In some implementations, the datastore may only store tapped I/O data 130 received with a particular time period (e.g., within the past week, within the past month, with the past year, etc.). In some implementations, medium(s) 520 may also store one or more additional datastores 231 of human readable text from other sources or datastore 229 of ICS historical maintenance information (not shown in FIG. 6) as described above.

Computer readable medium(s) 520 may also store a variety of different instructions that are executable by processing device 510 to perform various methods in accordance with the disclosure. For example, medium(s) 520 may store instructions 521 that are executable by processing device 510 to use at least a trained model (e.g., model 226) to predict events (e.g., failures) or prescribe maintenance for ICS 100. Medium(s) 520 may also store instructions 522 that are executable by processing device 510 to run a computational twin that executes an original or modified version of all or a subset of the control code 125 of ICS 100. Medium(s) 520 may also store instructions 523 that are executable by processing device 510 to run a digital twin that provides a virtual representation of a physical, real-world process, device, or system of ICS 100. For example, the digital twin may provide a physics model representation of the operation of a motor of ICS 100. Medium(s) 520 may also store instructions 524 that are executable by processing device 510 to extract human readable text output from tapped I/O data.

Figure 7:
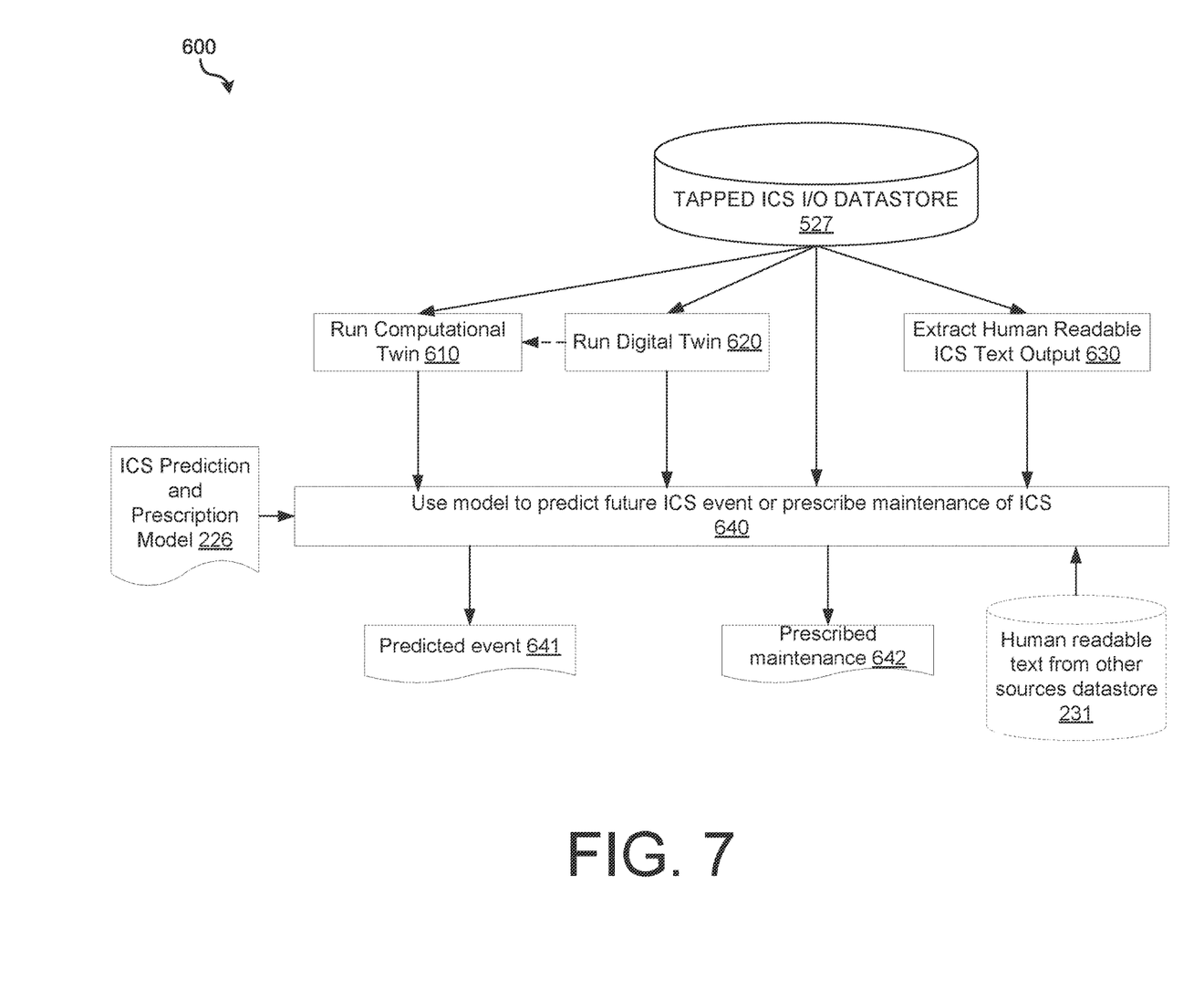
FIG. 7 is an operational flow diagram illustrating an example method for using tapped ICS I/O data and one or more models to perform predictive and prescriptive maintenance of the ICS of FIG. 1, in accordance with implementations of the disclosure.

FIG. 7 is an operational flow diagram illustrating an example method 600 for using tapped ICS I/O data and one or more models 226 to perform predictive and prescriptive maintenance of ICS 100, in accordance with implementations of the disclosure. In some implementations, method 600 may be implemented by a processing device 510 executing instructions 521 and one or more of instructions 522, 523, and 524.

At operation 610, a computational twin is run (e.g., by executing instructions 522) using the ICS I/O data of tapped ICS I/O datastore 527. The computational twin executes an original or modified version of all or a subset of the control code 125 of ICS 100. The computational twin may be run using a virtual machine that uses tapped ICS I/O data to provide an emulation of controller 120, including input components 121, output components 122, and processing device 123. In some implementations, the computational twin may be run using hardware that emulates components of the control system of the ICS, or using a combination of virtualized and physical hardware.

The computational twin emulating the controller 120 may be configured to expand upon the human readable textual information output by ICS 100 by virtue of not being limited to the same bandwidth constraints of human operators reading the text. Additionally, by virtue of not having the same memory and bandwidth constraints of controller 120 (e.g., by leveraging modern hardware components that far exceed the processing capabilities of a legacy controller), far greater information may be processed and output by the computational engine of the computational twin. For example, certain routines or processes within the original control code 125 may be run at a far greater speed or scan rate, allowing the generation of additional messages or other data. In some implementations, additional routines or processes may be added to the control code, or original routines or processes may be modified to provide additional information. This may permit the generation of additional messages that a control systems engineer would have preferred for ICS 100 but were not available due to hardware or software programming constraints of controller 120. In some implementations, the computational twin may be run using specialized hardware.

The computational twin may provide an improved mechanism of performing data analytics of ICS 100 that has not been previously performed. By emulating/duplicating and augmenting the operation of the control system, additional prescriptive or predictive actions may be devised for ICS 100. In some implementations, the output of the computational twin may be used for this purpose, regardless of whether or not a model is used for prescriptive and predictive maintenance.

In some implementations, the computational twin may itself be configured to run some of its code based on one or more additional data streams (input and/or output) generated by one or more sensors external to ICS 100. For example, the one or more external sensors may be integrated into a hardware system including the computational twin. The one or more external hardware sensors may be configured to emulate the behavior of ICS devices 110. In some implementations, the operation of the external sensors may be virtualized.

At operation 620, a digital twin is run (e.g., by executing instructions 523) using the ICS I/O data of tapped ICS I/O datastore 527. The digital twin may be run using one or more physics models 227 that provide virtual representations of one or more processes, devices, or systems of ICS 100. For example, the digital twin may include a virtual space that contains all of the tapped I/O data for a particular device, process, or system of ICS 100 such as control parameters, sensor data, or historical data. The digital twin may also run one or more physical models that represent facility dynamics to verify operational efficiency and accuracy of the ICS 100 or its components.

In some implementations, the digital twin may itself be configured to run based on one or more additional data streams (input and/or output) generated by one or more sensors external to ICS 100. In some implementations, depicted by FIG. 7, the computational twin may also run by using the output of the digital twin, or by running the digital twin itself. The computational twin may run the digital twin using a physics model 227 and data output from the ICS facilities.

At operation 630, human readable text output by ICS 100 is extracted from the ICS I/O data of tapped ICS I/O datastore 527. The human readable text may include any messages, showing the state of the ICS, that are designed to be presented to an operations or maintenance team during operation of ICS 100. During typical operation of the control system, these messages may appear on a display. For example, in the context of a ride system, these messages may provide a readable textual indication to a human operator that gates have opened (e.g., "gate 3 open"), that gates are engaged (e.g., "gate 2 engaged"), that a vehicle took a certain amount of time to travel between two points (e.g., "30 seconds"), or any other human readable information that provides an indication of what is occurring at a facility associated with the ride system.

At operation 640, a model 226 is used to predict a future event pertaining to ICS 100 or to prescribe maintenance of ICS 100. For example, given the input of one or more of running operations 610-630 and datastore 527, a learned model 226 may output text that predicts future events 641 (e.g., failures) of the ICS 100, that predicts future maintenance events of the ICS 100, or that prescribes maintenance 642 (e.g., maintenance step(s)) for the ICS 100. The output text (e.g., text 641 or 642) may be presented as an alert or notification that is delivered over a communication network to a device of an operator or manager of the ICS. For example, the alert or notification may be delivered to an application running on a mobile device of the operator or manager.

It should be appreciated that although method 600 is described in the context of using a model 226 that takes four different inputs (i.e., output of each of operations 610-630 and datastore 527), to make a prediction or prescription relating to maintenance of ICS 100, fewer than four of these inputs (e.g., three, two, or one) or more than four these inputs (e.g., input from additional datastore 231, described above) may be used. For example, in some implementations, model 226 may be configured to map the output of running computational twin 610 on tapped I/O data to a predictive or prescriptive maintenance event. In such implementations, operation 640 may use only the output of operation 610 and model 226 to output a predicted event 641 or prescribed maintenance 642.

To illustrate the operation of the systems and methods described herein, consider an ICS 100 corresponding to an elevator or vertical conveyance. Before a guest walks into the elevator, the guest selects a button for the elevator to up or down. This is an input to the controller 120 of the ICS 100 that may send an output to the motor and to the elevator to indicate what direction to travel based on what floor the guest is on. This selection may cause the controller 120 to send a human readable control system output that says "moving elevator to floor x." This output may be part of tapped I/O data 130. A computational twin, running on a remote or local system 500 that receives tapped I/O data 130, seeing that same input, may also send that same message out, but that message may also be input to a trained model. In addition, there may be another set of messages (e.g., messages indicating locations of other elevators, how many people are waiting for the elevator, etc.) that would be useful, but for one reason or another are not output by running the code of controller 120. By contrast, the computational twin may be configured to also output these sets of messages.

A digital twin, running on a remote or local system 500 that receives tapped I/O data 130, may use a physics model to monitor the movement of the elevator car and speed at which it is moving to determine if it matches what it should be for the motor. For example, the output data may be obtained by feedback of the elevator motor's encoder that sends digital information about elevator speed (e.g., in millisecond intervals). For example, if the motor data indicates that the field current is not what it should be, a future failure may be predicted.

Maintenance work orders pertaining to past maintenance of the elevator system may be used to build a predictive and prescriptive maintenance model.

After the elevator vehicle reaches the desired floor and the doors open, the controller 120 may send a human readable message indicating that the doors are opening. The computational twin, in addition to indicating that the doors are opening, may be configured to provide other information such as the rate at which the elevator moved and any other tens or even hundreds of messages that were not included in the operation of the control system. The digital twin may examine the rate that the doors open to determine that they run correctly.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, causes a system to perform operations comprising:
   receiving tapped data that was tapped from a controller of an industrial control system (ICS) while the controller executed first control code to control one or more ICS devices of the ICS, the tapped data used during execution of the first control code, and the tapped data comprising input data obtained from one or more input components of the controller communicatively coupled to the one or more ICS devices, or output data obtained from one or more output components of the controller communicatively coupled to the one or more ICS devices;

after receiving the tapped data, executing, using at least the tapped data, second control code that provides an emulation of the controller, the emulation comprising running, using at least the tapped data, a process of the first control code at a faster rate than it is run by the controller executing the first control code.

2. The non-transitory computer-readable medium of claim 1, wherein:

the operations further comprise: obtaining second data that is generated at the ICS or generated by a sensor external to the ICS, the second data not used during execution of the first control code; and the emulation comprises running, using at least the tapped data and the second data, the process of the first control code at the faster rate than it is run by the controller executing the first control code.

3. The non-transitory computer-readable medium of claim 2, wherein the second data is generated at the ICS.

4. The non-transitory computer-readable medium of claim 2, wherein:

the operations further comprise: generating, at the sensor external to the ICS, the second data; and the sensor external to the ICS is configured to emulate the behavior of at least one of the one or more ICS devices.

5. The non-transitory computer-readable medium of claim 1, wherein:

the operations further comprise: obtaining second data that is generated at the ICS or generated by a sensor external to the ICS, the second data not used during execution of the first control code; and executing the second control code further comprises: executing, using at least the second data, a process that is not executed by the first control code.

6. The non-transitory computer-readable medium of claim 5, wherein:

execution of the first control code by the ICS generates a first human readable ICS text output providing an indication of a first parameter of the ICS, and executing the second control code comprises generating the first human readable ICS text output and a second human readable ICS text output providing an indication of a second parameter of the ICS, wherein the second human readable ICS text output is not generated by execution of the first control code.

7. The non-transitory computer-readable medium of claim 1, wherein the emulation further comprises: emulating, using at least the tapped data, a processing device of the controller, the one or more input components of the controller, or the one or more output components of the controller.

8. The non-transitory computer-readable medium of claim 1, wherein the operations further comprise:

providing, as an input to a trained model, first data corresponding to an output of executing the second control code;

outputting, using the trained model, based at least on the first data, a prediction indicating a future failure of the ICS or future maintenance event of the ICS.

9. The non-transitory computer-readable medium of claim 1, wherein the operations further comprise: running, using at least the tapped data and one or more physics models, a virtual representation of a device, process, or system of the ICS.

10. The non-transitory computer-readable medium of claim 9, wherein the operations further comprise:

providing, as an input to a trained model, first data corresponding to an output of executing the second control code, and second data corresponding to an output of running the virtual representation; and outputting, using the trained model, based at least on the first data and the second data, a prediction indicating a future failure of the ICS or future maintenance event of the ICS.

11. The non-transitory computer-readable medium of claim 10, wherein:

the operations further comprise: extracting, from the tapped data, a human readable text output providing an indication of a parameter of the ICS; and outputting the prediction comprises: outputting, using the trained model, based at least on the first data, the second data, and the human readable text output, the prediction.

12. A system, comprising:

a network data tap device communicatively coupled to an industrial control system (ICS), the network data tap device configured to: tap data from a controller of the ICS while the controller executes first control code to control one or more ICS devices of the ICS, the tapped data used during execution of the first control code, and the tapped data comprising input data obtained from one or more input components of the controller communicatively coupled to the one or more ICS devices, or output data obtained from one or more output components of the controller communicatively coupled to the one or more ICS devices;

one or more processors; and one or more non-transitory computer-readable media having executable instructions stored thereon that, when executed by the one or more processors, cause the system to perform operations comprising:

receiving the tapped data; and after receiving the tapped data, execute, using at least the tapped data, second control code that provides an emulation of the controller, the emulation comprising running, using at least the tapped data, a process of the first control code at a faster rate than it is run by the controller executing the first control code.

13. The system of claim 12, wherein:

the operations further comprise: obtaining second data that is generated at the ICS or generated by a sensor external to the ICS, the second data not used during execution of the first control code; and the emulation comprises running, using at least the tapped data and the second data, the process of the first control code at the faster rate than it is run by the controller executing the first control code.

14. The system of claim 13, wherein the second data is generated at the ICS.

15. The system of claim 13, further comprising the sensor external to the ICS, wherein the sensor is configured to generate the second data and emulate the behavior of at least one of the one or more ICS devices.

16. The system of claim 12, wherein:

the operations further comprise: second data that is generated at the ICS or generated by a sensor external to the ICS, the second data not used during execution of the first control code; and executing the second control code further comprises: executing, using at least the second data, a process that is not executed by the first control code.

17. The system of claim 12, wherein the operations further comprise:
- providing, as an input to a trained model, first data corresponding to an output of executing the second control code;
- outputting, using the trained model, based at least on the first data, a prediction indicating a future failure of the ICS or future maintenance event of the ICS.

18. The system of claim 12, wherein the operations further comprise: running, using at least the tapped data and one or more physics models, a virtual representation of a device, process, or system of the ICS.

19. The system of claim 18, wherein the operations further comprise:
- providing, as an input to a trained model, first data corresponding to an output of executing the second control code, and second data corresponding to an output of running the virtual representation; and
- outputting, using the trained model, based at least on the first data and the second data, a prediction indicating a future failure of the ICS or future maintenance event of the ICS.

20. A method, comprising:
- receiving, at a first system, tapped data that was tapped from a controller of an industrial control system (ICS) while the controller executed first control code to control one or more ICS devices of the ICS, the tapped data used during execution of the first control code, and the tapped data comprising input data obtained from one or more input components of the controller communicatively coupled to the one or more ICS devices, or output data obtained from one or more output components of the controller communicatively coupled to the one or more ICS devices; and
- after receiving the tapped data, executing, at the first system, using at least the tapped data, second control code that provides an emulation of the controller, the emulation comprising running, using at least the tapped data, a process of the first control code at a faster rate than it is run by the controller executing the first control code.

* * * * *